March 21, 1950 A. M. OPSAHL 2,501,352

CONTROLLING MEANS FOR OPERATING AN ELECTRONIC OSCILLOGRAPH TO PRODUCE A RECORD

Filed Nov. 16, 1944

WITNESSES:

James F. Young

Wm. C. Groome

INVENTOR

Alert M. Opsahl.

BY C. L. Freedman

ATTORNEY

Patented Mar. 21, 1950 2,501,352

UNITED STATES PATENT OFFICE 2,501,352

CONTROLLING MEANS FOR OPERATING AN ELECTRONIC OSCILLOGRAPH TO PRODUCE A RECORD

Alert M. Opsahl, Pittsburgh, Pa., assignor to Westinghouse Electric Corporation, East Pittsburgh, Pa., a corporation of Pennsylvania Application November 16, 1944, Serial No. 563,753

11 Claims. (Cl. 346—110)

Figure 1:
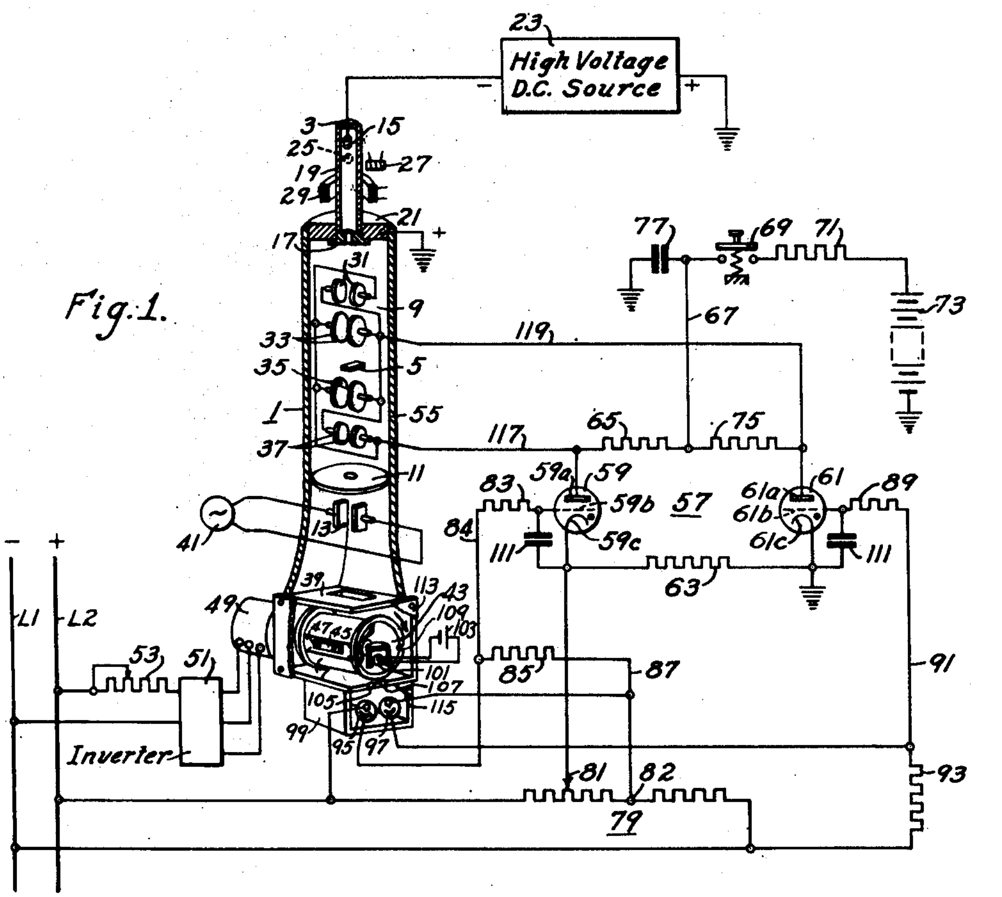

This invention relates to electronic systems, and it has particular relation to electronic control systems suitable for controlling electronic oscillographs of the type producing a record on a moving or rotating recording surface.

In accordance with the invention, an electronic control system is provided which is responsive to two conditions for producing two controlling actions. Such an electronic control system is particularly suitable for controlling an electronic oscillograph of the type producing a record on a moving or rotating recording surface, and will be described with reference to such an oscillograph.

An oscillograph for producing a record on a rotating recording surface may include an electron gun for generating an electron beam, and means for deflecting the electron beam in accordance with some phenomenon to be studied. The oscillograph may include means for preventing the electron beam from impinging on the recording surface. A suitable control is provided for releasing the electron beam to permit it to impinge on the recording surface.

If the recording surface rotates continuously while the electron beam impinges thereon, the record formed on the surface may continue for several rotations of the surface. Such a record may have numerous overlapping portions which are extremely difficult to analyze.

In accordance with the invention, the electron beam of an oscillograph is permitted to form a record on the recording surface only for a predetermined movement of the recording surface such as one revolution thereof. The resulting record readily may be analyzed.

The invention contemplates the provision of an electronic control system which is responsive to a predetermined position of the recording surface for activating the oscillograph to permit the electron beam to impinge on the recording surface. The electronic control system is responsive to a predetermined movement of the recording surface, such as one revolution thereof, to terminate the production by the electron beam of a record on the recording surface.

In a preferred embodiment of the invention, the electronic control system comprises a pair of electronic tubes, one of which is responsive to a predetermined position of the recording surface for initiating production of a record thereon. After initiation of the record production, the electronic control system locks in to permit continuation of the record for a predetermined movement of the recording surface, such as one revolution thereof. At this time, the electronic control system terminates production of the record until this system is reset for a further operation. It will be noted that the electronic control system is designed to lock in after initiation of a recording operation until the formation of the record is terminated. The electronic control system then locks out until it is reset. The lock-in and lock-out of the electronic control system is obtained in a preferred embodiment of the invention by employing electronic tubes of the gaseous discharge type.

It is, therefore, an object of the invention to provide an improved electronic system including an oscillograph for producing a record on a moving recording surface, and electronic control means for controlling the initiation and termination of the record production.

It is a further object of the invention to provide an improved electronic control system responsive to a pair of conditions for producing separate locked controlling operations.

It is an additional object of the invention to provide an electronic control system employing gaseous discharge tubes for producing successive locked controlling actions in response to predetermined successive conditions.

Figure 2:
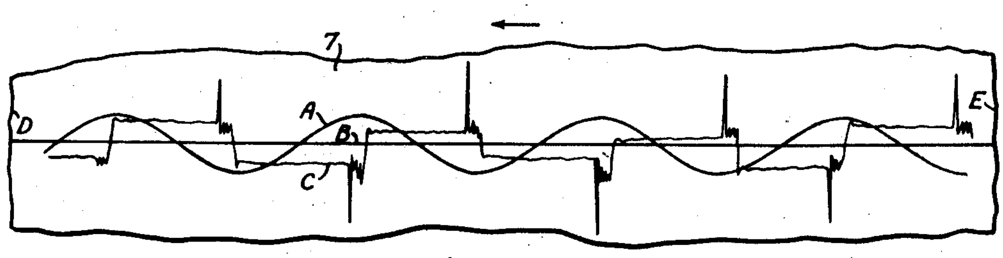

Other objects of the invention will be apparent from the following description taken in conjunction with the accompanying drawing, in which:

Figure 1 is a schematic view with parts in perspective and parts broken away of an electronic system embodying the invention; and Fig. 2 is a diagrammatic view of a record produced by the system of Fig. 1.

Referring to the drawing, Fig. 1 shows an electronic oscillograph, which may be of any suitable construction. In Fig. 1 a cold cathode oscillograph 1 is disclosed which includes an electronic gun 3 capable of producing an electron beam. The electron beam is directed against a target or barrier 5 which prevents the beam from impinging on a recording surface 7. To permit the electron beam to reach the recording surface 7, a deflecting electrode system, referred to in the art as a relay 9, is provided for deflecting or bending the electron beam around the target 5. As a result of this bending, the electron beam passes through an opening in the diaphragm 11 to impinge on the recording surface 7. Suitable deflecting means, such as a pair of deflecting plates 13, are provided for deflecting the electronic beam when suitably energized in accordance with a phenomenon to be studied.

The electron gun 3 may include a cathode 15 formed of a suitable material such as aluminum and an anode 17 which may be constructed of silver. The cathode and anode are spaced by means of an insulating tube of glass 19. The anode 17 is secured to an electroconductive disk 21 which forms part of the container of the oscillograph. This disk 21 is grounded. By inspection of Fig. 1, it will be noted that the cathode 15 is connected to the negative terminal of a direct-current high-voltage source 23, and the positive terminal of the source is grounded.

In order to control the electron beam, suitable deflecting and focusing coils may be associated with the oscillograph, as desired. For example, in Fig. 1 a pair of deflecting coils 25 and 27 are disposed at right angles to each other adjacent the path of the electron beam in the gun 3. In addition, a focusing coil 29 surrounds the electron gun 3. As well understood in the art, direct current may be passed through the coils 25 and 27 for the purpose of centering the electron beam in the electron gun. Also, as well understood in the art, direct current may be passed through the focusing coil 29 for the purpose of focusing the electrons into a compact well defined beam.

As previously pointed out, the electron beam formed by the gun is directed against a target 5. However, when the relay 9 is suitably energized, the electron beam is bent around the target 5 and directed through an opening in the diaphragm 11. It will be noted that the relay 9 includes pairs of deflecting plates 31, 33, 35 and 37, and a common voltage is applied across the pairs of deflecting plates. As the electron beam passes between the plates 31, it is deflected by the field between the plates 31 away from the axis of the oscillograph in order that the beam may pass the target 5. However, the field between the plates 33 is reversed relative to that between the plates 31. Consequently, as the electron beam passes between the plates 33, the field between these plates begins to return the electron beam towards the axis of the oscillograph. This action is continued by the plates 35. Finally the electron beam passes between the plates 37. These plates produce a field which is reversed relative to the field between the plates 35. The field between the plates 37 is proportioned to restore the electron beam to a path following the axis of an oscillograph and passing through an opening in the diaphragm 11. The electron beam then passes between the deflecting plates 13 and through an opening in the masking plate 39 to impinge on the recording surface 7. A voltage to be studied may be applied across the deflecting plates 13 for deflecting the electron beam in accordance therewith. Such a voltage is represented by an alternating source 41. As a specific example, the source 41 may represent the ignition voltage of a gasoline engine.

The recording surface 7 may take the form of a sheet of photosensitive or photographic paper or film which is wrapped around a hollow drum 43. The ends of the paper may be secured to the drum 43 by means of a clamping strip 45 which is removably secured to the drum in any suitable manner as by machine screws 47. The drum may be rotated in the direction of the arrow by means of a motor 49. If desired, this motor may be a three-phase motor which is energized in any suitable manner. As illustrated in Fig. 1, the motor 49 is energized through an inverter 51 from a direct-current source represented by a negative conductor L1 and a positive conductor L2. The inverter 51 may be of any conventional construction; for example, the inverter may comprise a motor-generator set having a direct-current motor connected to the conductors L1, L2 through an adjustable rheostat 53. The generator may be a three-phase generator suitable for energizing the motor 49. By adjustment of the rheostat 53, the frequency of the output of the generator and the speed of the motor 49 may be suitably adjusted.

The essential elements of the oscillograph thus far specifically described are well known in the art. For example, reference may be made to the Nordinder Patent No. 1,910,560. The relay 9, the target 5, the diaphragm 11, the deflecting plate 13, the drum 43, and the motor 49 may be located in a container 55 which is closed at one end by the gun 3. This container may be evacuated by a continuous pumping system, such as that disclosed in the Ackermann Patent 2,276,639.

In order to restrict the formation of a record on the recording surface 7 to a predetermined movement of the drum 43, such as one revolution thereof, an electronic control system 57 is provided. This electronic control system includes an electronic tube 59 for controlling the initiation of the production of a record on the drum 43 and an electronic tube 61 for controlling the termination of the production of a record on the drum 43. The tube 59 is illustrated as having an anode 59*a*, a grid or control electrode 59*b*, and a cathode 59*c*. The anode and cathode are main electrodes defining a path or space for current which is controlled by the control electrode or grid 59*b*. Similarly the tube 61 is provided with an anode 61*a*, a grid or control electrode 61*b*, and a cathode 61*c*. The cathode 61*c* is grounded and is connected to the cathode 59*c* through a resistor 63. The plate 59*a* is connected to ground through a plate resistor 65, a conductor 67, a switch 69, a resistor 71, and a battery 73 which has its negative terminal connected to ground. The plate 61*a* is connected to ground through a resistor 75, the conductor 67, the switch 69, the resistor 71, and the battery 73. A filter capacitor 77 may be connected between the conductor 67 and ground.

Grid bias for the tubes 59 and 61 is provided by a voltage divider 79 which is connected across the conductors L1 and L2. The cathode 59*c* is connected to the voltage divider by means of an adjustable tap 81. The grid 59*b* of the tube 59 is connected to a centrally disposed tap 82 on the voltage divider through a resistor 83, a conductor 84, a resistor 85, and a conductor 87. Consequently, the grid 59*b* is biased negatively relative to the cathode 59*c* to an extent determined by the distance between the taps 81 and 82. The grid 61*b* is connected to the negative terminal of the voltage divider 79 through a resistor 89, a conductor 91, and a resistor 93. Consequently, when the tubes 59 and 61 are not passing current, the grid of the tube 61 is biased negatively with respect to the cathode 61*c* to an extent represented by the distance between the tap 81 and the negative terminal of the voltage divider 79. Therefore, both of the tubes 59 and 61 are negatively biased to prevent passage of current between their main electrodes.

To initiate a discharge in the tube 59, a light-sensitive or photoelectric cell 95 is connected between the conductor 84 and the positive terminal of the voltage divider. To initiate a discharge in the tube 61, a light-sensitive or photoelectric cell 97 is connected between the conductors 87 and 91.

The photoelectric cells 95 and 97 are disposed in an enclosure 99 which is secured to the container 55 and are intended to be illuminated once for each rotation of the drum 43. For this purpose a light source, such as an electric lamp 101, is disposed within the drum 43 and is energized in any suitable manner as from a battery 103. Under predetermined conditions, light from the light source passes through openings 105 and 107 to illuminate, respectively, the photoelectric cells 95 and 97. It will be understood that the enclosure 99 may have an air-tight seal with the container 55 and may be evacuated by the pumping system employed for the container 55. It will be understood further that all connections to parts positioned within the evacuated container and enclosures are passed through the container and enclosures by means of air-tight seals.

Passage of light from the light source 101 through the openings 105 and 107 is controlled by a shutter which is responsive to rotation of the drum 43. Conveniently, the shutter may be formed by the rim of the drum which has a slot or notch 109 formed therein. By inspection of Fig. 1, it will be observed that each of the photoelectric cells 95 and 97 is illuminated once for each rotation of the drum 43.

It is desirable that the controlling action effected by the electronic tube 59 continue until initiation of a discharge in the electronic tube 61, and that the controlling action initiated by the electronic tube 61 continue until release of the switch 69. Such operation conveniently may be obtained by employing gaseous discharge tubes for the electronic tubes 59, 61. For example, these tubes may be of the type known as KU627, the characteristics of which are set forth in the Electrical Engineers Handbook by Pender and McIlwain, third edition, published by John Wiley & Sons, New York city, pages 5–42.

As well understood in the art, impedances and voltages employed in electronic circuits may be varied appreciably. As a specific example, however, satisfactory operation of the electronic control system 57 may be obtained if the battery 73 is designed to apply a voltage of the order of 1,000 volts across the plate-cathode circuits of the electronic tubes 59 and 61. The resistors 65 and 75 each may have a resistance value of 100,000 ohms. The resistors 83, 89, and 63 each may have a resistance value of 10,000 ohms. The resistors 85 and 93 may have a resistance value of 3 megohms. Somewhat improved stability may be obtained by providing a small amount of capacitance between the grid and cathode of each of the electronic tubes 59 and 61. The desired amount of capacitance may be obtained from the conductors attached to the grid and cathode. However, in Fig. 1, capacitors 111, each having a capacitance of .0008 microfarad, are illustrated for the foregoing purpose.

It is believed that the operation of the system illustrated in Fig. 1 now may be set forth. If a record is to be taken of ignition voltages of a gasoline engine, the ignition voltages are applied to the deflecting plates 13. The ignition voltages are represented in Fig. 1 by the source 41. A photosensitive strip is wrapped around the drum 43 and clamped securely to the drum. It will be noted that removable doors 113 and 115 are illustrated in Fig. 1 to provide access to the drum and to the photoelectric cells 95 and 97. These doors when in mounted position complete a substantially air-tight seal for the container 55. The container 55 next is evacuated by means of a suitable pumping system such as that illustrated in the aforesaid Ackermann patent. As representative of suitable pressures within the container, the pressure within the electron gun 3 may be of the order of 10 microns of mercury, whereas the pressure within the remainder of the container 55 may be of the order of 2 microns of mercury.

The high voltage source 23 is connected between the cathode 15 and the anode 17 to produce an electron beam directed along the axis of the container 55. The pressure within the electron gun 3 and the voltage of the source 23 may be varied appreciably. However, with a pressure of 10 microns, a voltage of the order of 50,000 volts may be applied between the cathode 15 and the anode 17.

Since the electron beam travels along the axis of the container 55, it impinges on the target 5 and does not reach the photosensitive surface 7. In order to bend the electron beam around the target 5, the relay 9 must be energized with a voltage which may be of the order of 900 volts. This voltage is obtained by connecting the terminals of the relay 9 by conductors 117 and 119, respectively, to the plates 59*a* and 61*a* of the electronic tubes. However, such voltage is not applied to the relay until the switch 69 is actuated to close its contacts. It will be understood further that the motor 49 is energized to rotate the drum 43 continuously. The rate of rotation of the motor is controlled by means of the rheostat 53, and the rate of rotation may be determined in any suitable manner as by measuring the frequency output of the inverter 51. In addition, the light source 101 is illuminated by connecting it to the battery 103. With the system as thus described in operation, the photocells 95 and 97 are illuminated during each revolution of the drum 43, but such illumination of the photoelectric cells does not initiate discharges in the electronic tubes 59 and 61 for the reason that the switch 69 is open, and no plate voltage is applied therethrough to the electronic tubes. Since the plates of the relay 9 are connected by the resistors 65 and 75, they are at substantially the same potential and the path of travel of the electron beam remains along the axis of the container 55.

To produce a record on the recording surface 7, the switch 69 is actuated to close its contacts. Such actuation of the switch of itself does not affect the path of travel of the electron beam for the reason that as long as no discharge occurs in one of the electronic tubes 59 or 61, all plates of the relay 9 are at the same potential with respect to ground.

As the drum rotates, the slot 109 moves into alignment with the opening 107 to illuminate the photocell 97. This decreases the negative bias on the grid of the electronic tube 61, but since this grid is biased negatively with respect to its cathode by a large voltage such as 90 volts, the illumination of the tube 97 does not initiate a discharge in the electron tube 61.

The slot 109 continues its movement until it is in alignment with the opening 105. At this point, the photocell 95 is illuminated to establish a low resistance path between the conductor 84 and the positive terminal of the voltage divider making the grid 59*b* more positive with respect to the cathode 59*c*. Consequently illumination of the photocell 95 initiates a discharge in the electronic tube 59, and plate current flows through the tube through a circuit which may be traced from ground through the battery 73, the resistor 71, the switch 69, the conductor 67, the plate resistor 65, the main electrodes 59a and 59c of the electronic tube 59, and the resistor 63 to ground. The plate current in flowing through the resistor 65 produces a voltage drop thereacross which may be of the order of 900 volts. Consequently, this voltage is applied to the terminals of the relay 9 to bend the electron beam around the target 5. The electron beam passes through the opening in the diaphragm 11 and is deflected by the plates 13 in accordance with the voltage of the source 41. The deflected voltage passes through the mask 39 and produces a record on the recording surface 7. It will be noted that the slot 109 is so located that it illuminates the photocell 95 immediately after the bar 45 passes the opening in the mask 39. Consequently, the record on the recording surface 7 is initiated adjacent the leading edge of the recording surface 7.

After a discharge is initiated by the grid in the electronic tube 59, the grid loses control of the discharge, and current continues to flow between the main electrodes of the tube. Consequently, the relay continues to bend the electron beam around the target 5 and a continuous record is produced on the recording surface 7.

As the drum 43 continues its rotation, the slot 109 again comes into alignment with the opening 107 to permit illumination of the photoelectric cell 97 by the light source 101. Such illumination of the photoelectric cell 97 results in initiation of a discharge in the electronic tube 61. This action may be explained by reference to Fig. 1. It will be noted that when a discharge is initiated in the electronic tube 59, the discharge current flows through the resistor 63. The voltage drop in the resistor 63 resulting from this discharge current makes the bias between the grid and cathode of the tube 61 less negative. It will be recalled that the grid-to-cathode circuit of the electronic tube 61 may be traced from the cathode 61c through the resistor 63, the tap 81, the portion of the voltage divider between the tap 81 and the negative terminal of the divider, the resistor 93, the conductor 91, and the resistor 89 to the grid 61b. Consequently, current flowing from the tube 59 through the resistor 63 produces a voltage drop across the resistor which, in the grid-cathode circuit of the electronic tube 61, is opposed to the voltage across the portion of the voltage divider 79 which is included in the circuit. The voltage drop across the resistor 63 is proportioned to make the bias on the grid 61b less negative by an amount such that illumination of the photoelectric cell 97 initiates a discharge in the electronic tube 61. It will be noted that the photoelectric cell 97 when illuminated produces a low resistance path between the conductors 87 and 91. The current flow through resistor 93 results in a voltage drop across its terminals which is in such a direction to make the grid 61b more positive and initiates a discharge in tube 61.

When a discharge is initiated in the tube 61, plate current flows through the plate resistor 75 which is associated with the tube 61. This plate current produces a voltage across the resistor 75 which is almost equal to that across the resistor 65. Consequently, all plates of the relay 9 again are at substantially the same potential with respect to ground, and the electron beam in the oscillograph 1 returns to a path which impinges on the target 5. This effectively discontinues the formation of a record on the record surface 7. By inspection of Fig. 1, it will be noted that the slot 109 is in alignment with the opening 107 when the bar 45 is about to pass under the opening in the mask 39. Consequently, the record formed on the recording surface 7 continues substantially to the end of the recording surface 7. The recording operation is effective for slightly less than one revolution of the drum 43.

Since the electronic tube 61 is a gaseous discharge tube, the grid 61b after initiation of a discharge in the tube loses control of the discharge. Therefore, current continues to flow through both of the tubes 59 and 61 until the switch 69 is released to open its contacts. This restores the electronic control system to its initial condition wherein no plate voltage is applied to the electronic tubes 59 and 61. If a subsequent record is desired, the switch 69 again is actuated to close its contacts. Such actuation initiates a repetition of the cycle of operation which has just been described. After the desired record has been produced on the record surface 7, the cover 113 may be removed, and the recording surface 7 may be removed from the drum 43.

A typical record produced on the recording surface 7 is illustrated in Fig. 2. In Fig. 2, the recording surface 7 is shown with three records A, B and C formed thereon. The recording surface 7 is illustrated in Fig. 2 in development, and the records formed thereon were produced by moving the recording surface in the direction of the arrow past the opening in the masking plate 39. Consequently, the records A, B, and C are initiated adjacent the leading edge D of the recording surface and are finished adjacent the trailing edge E of the recording surface.

If the rate of rotation of the drum 43 is known, the length of time between any two points on a record formed on the recording surface 7 readily may be calibrated. However, in Fig. 2 a distinct timing wave A is provided. For example, such a timing wave may be produced by employing as the source 41 in Fig. 1 a source having a known frequency of voltage alternation such as 60 cycles per second. By actuation of the switch 69, the single record A then may be formed on the recording surface. Since the alternating wave A has a known frequency of alternation, it may be employed as a reference timing wave. After the record A has been formed on the recording surface 7, both of the deflecting plates 13 may be grounded and the switch 69 again actuated to produce a record on the recording surface 7. Such operation produces a zero line B which also may be employed for reference purposes.

Finally, a voltage corresponding to the phenomenon to be studied is connected across the deflecting plates 13. As previously suggested, this may be, for example, the ignition voltage of a gasoline engine. The switch 69 again is actuated to produce on the recording surface 7 the record C of the ignition voltage. Following the formation of the three records A, B, and C, the recording surface 7 may be removed from the drum 43 and developed to produce a composite record similar to that illustrated in Fig. 2. Since each of the component records is restricted to a single revolution of the drum 43, records are obtained which are free from confusing overlapping.

Although the invention has been described with reference to certain specific embodiments thereof, numerous modifications are possible. Therefore, the invention is to be restricted only by the appended claims as interpreted in view of the prior art.

I claim as my invention:

1. In an oscillograph device, means for producing a beam capable of deflection, an element having a surface for supporting a recording medium capable of developing a mark representing a beam trace in response to incidence of the beam thereon, means for moving the surface relative to the beam, electronic control means having control electrode means and energizing means for the control electrode means effective when suitably energized for deflecting the beam between two paths, means responsive to a first energization of the control electrode means for deflecting the beam from a first path displaced from a recording medium supported on the surface towards a second path impinging a recording medium supported on the surface, and means responsive to a predetermined movement of the surface relative to the beam for changing the energization of the control electrode means away from said first energization to deflect the beam away from the second path.

2. In an oscillograph device, means for producing a beam capable of deflection, an element having a surface for supporting a recording medium capable of developing a mark representing a beam trace in response to incidence of the beam thereon, means for moving the surface relative to the beam, electronic control means comprising means providing two space paths for current and a separate control electrode for controlling initiation of current flow in each of the paths, means effective for activating a first one of the control electrodes to initiate current flow in a first one of the paths, means responsive to the last-named current flow for deflecting the beam from a first travel displaced from a recording medium supported on the surface to a second travel incident on such recording medium supported on the surface, means responsive to a predetermined travel of the surface relative to the beam for activating a second one of the control electrodes to initiate current flow in a second one of the paths, and means responsive to the last-named current flow for deflecting the beam from the second to the first travel thereof.

3. In an electronic device, an element having a surface for supporting a recording medium capable of developing a mark representing the trace of an electric beam impinging on the recording medium, means for producing an electronic beam displaced from the surface, a pair of gaseous discharge tubes each having a pair of main electrodes and a control electrode for controlling initiation of a discharge between the main electrodes, means responsive to initiation of a discharge in a first one of the tubes for deflecting the beam from a first path displaced from the surface to a second path impinging on the surface, and means responsive to initiation of a discharge in a second one of the tubes for deflecting the beam away from said second path.

4. In an oscillograph device, an element having a surface for supporting a recording medium capable of developing a mark representing the trace of an electric beam impinging on the recording medium, means for producing an electronic beam displaced from the surface, said surface being movable relative to said electronic beam, a pair of gaseous discharge tubes each having a pair of main electrodes and a control electrode for controlling initiation of a discharge between the main electrodes, means responsive to a predetermined position of the surface for energizing the control electrode in a first one of the tubes to initiate a discharge therein, means responsive to initiation of a discharge in the first one of the tubes for deflecting the beam from a first path displaced from the surface to a second path impinging on the surface, means responsive to initiation of a discharge in a second one of the tubes for deflecting the beam away from said second path, and means responsive to a predetermined movement of the surface from the predetermined position for initiating a discharge in the second one of the tubes.

5. An oscillograph device as claimed in claim 4 wherein the means for initiating discharges in the tubes includes a light source, photoelectric means for receiving illumination from the light source, and shutter means interposed between the light source and the photoelectric means, said shutter means being responsive to movement of the recording surface for exposing the photoelectric means to the light source at intervals determined by the movement of the surface.

6. In an electronic device, first and second gaseous discharge tubes each including main electrodes and a control electrode suitable when the tube is energized for initiating a discharge between the main electrodes, means responsive to the discharge in each of the tubes for performing a separate control action, means connected in circuit with the control electrode of a first one of the tubes for initiating under a predetermined condition a discharge in the first tube, means conditioning the second one of the tubes against initiation of a discharge therein in response to application of a predetermined voltage between the associated control electrode and an associated main electrode, means responsive to a discharge in the first one of the tubes for conditioning the second one of the tubes for initiation of a discharge by said predetermined voltage, and means for applying to the control electrode of the second one of the tubes a voltage relative to an associated main electrode for initiating under a predetermined condition a discharge in the associated tube when the second one of the tubes is conditioned for initiation of a discharge by a discharge in the first one of the tubes.

7. In an electronic device, first and second gaseous discharge tubes each including main electrodes and a control electrode suitable when the tube is energized for initiating a discharge between the main electrodes, a pair of impedances, means establishing a circuit for each of the tubes which includes the main electrodes of a separate one of the tubes and a separate one of the impedances whereby current flowing through the main electrodes of one of the tubes produces a voltage across the one of the impedances connected in circuit with the last-named tube, means responsive to the voltage across each of the impedances for performing a separate control action, photoelectric means connected in circuit with the control electrode of a first one of the tubes for initiating under a predetermined condition of illumination of the photoelectric means a discharge in the first tube, means conditioning the second one of the tubes against initiation of a discharge therein by a predetermined voltage between the control electrode and a main electrode of the second one of the tubes, means responsive to a discharge in the first one of the tubes for conditioning the second one of the tubes for initiation of a discharge upon application of said predetermined voltage, and photoelectric means connected in circuit with the control electrode of the second one of the tubes for initiating under a predetermined condition of illumination a discharge in the second one of the tubes when the second one of the tubes is conditioned for initiation of a discharge.

8. In an electronic device, an oscillograph having means for producing an electronic beam and an element having a surface for supporting a recording medium displaced from the electronic beam, said surface being movable relative to the electronic beam, a pair of gaseous discharge tubes each including main electrodes and a control electrode suitable when the tube is energized for initiating a discharge between the main electrodes, a pair of impedances, means establishing a circuit for each of the tubes which includes the main electrodes of a separate one of the tubes and a separate one of the impedances whereby current flowing through the main electrodes of one of the tubes produces a voltage across the impedance connected in circuit with the last-named tube, means responsive to the voltage across a first one of the impedances for deflecting the electronic beam to impinge on the surface, said means being responsive to the voltage across a second one of the impedances for deflecting the beam away from the surface, a photoelectric means connected in circuit with the control electrode of a first one of the tubes for initiating under a predetermined condition of illumination of the photoelectric means a discharge in the last-named tube, means conditioning the second one of the tubes against initiation of a discharge therein, means responsive to a discharge in the first one of the tubes for conditioning the second one of the tubes for initiation of a discharge, and photoelectric means connected in circuit with the control electrode of the second one of the tubes for initiating under a predetermined condition of illumination a discharge in the second one of the tubes when the second one of the tubes is conditioned for initiation of a discharge, and shutter means including a shutter element operated in accordance with movement of the surface relative to the electronic beam for controlling the illumination of the photoelectric means.

9. In a recording device, an element having a supporting surface for a recording medium, means for producing a recording beam which does not reach said surface to prevent production of a record on a recording medium supported on the surface, means for moving said surface relative to said beam repetitively through a predetermined path, controlling means effective when suitably activated for modifying the direction of said recording beam to direct said beam towards the surface to produce a record on a recording medium supported on the surface, means for activating said controlling means to modify the direction of the recording beam for starting production of a record on the recording medium by the beam, and means responsive to travel of the surface over a predetermined distance from the position wherein production of a record starts for terminating production of the record on the recording medium.

10. In a recording device, an element having a supporting surface for a recording medium, means for directing an electron beam towards the surface, barrier means in the path of the beam for preventing the beam from impinging on the surface, means for moving the surface relative to the beam, control means including energizing means responsive to a predetermined position of the surface for deflecting the beam relative to the barrier means to initiate production by the beam of a record on a recording medium supported on the surface, and means cooperating with the control means in response to a predetermined movement of the surface after each initiation of production of a record to alter the energization of the control means for terminating production of the record on a recording medium supported on said surface.

11. In an oscillograph device, a container capable of being evacuated, means disposed in the container for producing, when energized, an electron beam, a supporting element disposed in the container for supporting a medium capable of developing a mark representing the trace of an electron beam impinging on the medium, a light-source element, a light-responsive element, said elements being disposed for transmitting light from the light source element through a portion of the container to the light-responsive element, a movable shutter located within the container for movement into and out of the path of said light, and control means responsive to the output of the light-responsive element for controlling the position of the electron beam relative to the supporting element in accordance with the position of the shutter relative to said path.

ALERT M. OPSAHL.

REFERENCES CITED

The following references are of record in the file of this patent:

UNITED STATES PATENTS

| Number | Name | Date |
|---|---|---|
| 1,472,859 | Vasselli | Nov. 6, 1923 |
| 1,736,456 | Matthias | Nov. 19, 1929 |
| 1,779,794 | Ackermann | Oct. 28, 1930 |
| 1,960,333 | Du Mont | May 29, 1934 |
| 2,020,917 | Stogoff | Nov. 12, 1935 |
| 2,251,332 | Gray | Aug. 5, 1941 |
| 2,328,461 | Keinle et al. | Aug. 31, 1943 |
| 2,399,661 | Bowie | May 7, 1946 |
| 2,399,695 | Satterlee | May 7, 1946 |
| 2,406,856 | Satterlee | Sept. 3, 1946 |
| 2,415,059 | Zworykin | Jan. 28, 1947 |
| 2,430,538 | Somers | Nov. 11, 1947 |
| 2,436,148 | Maurer, Jr. | Feb. 17, 1948 |

FOREIGN PATENTS

| Number | Country | Date |
|---|---|---|
| 391,006 | Great Britain | Apr. 20, 1933 |
| 641,461 | France | Apr. 16, 1928 |